United States Patent
DiLeo et al.

(10) Patent No.: US 8,522,819 B2
(45) Date of Patent: Sep. 3, 2013

(54) FLUID DISTRIBUTION ASSEMBLY FOR TESTING SYSTEMS

(75) Inventors: Gregory DiLeo, Ann Arbor, MI (US); Nilesh Dale, Farmington Hills, MI (US); Kevork Adjemian, Birmingham, MI (US); Shyam Kocha, Golden, CO (US)

(73) Assignee: Nissan North America, Inc., Franklin, TN (US)

( * ) Notice: Subject to any disclaimer, the term of this patent is extended or adjusted under 35 U.S.C. 154(b) by 317 days.

(21) Appl. No.: 13/011,192

(22) Filed: Jan. 21, 2011

(65) Prior Publication Data

US 2012/0186994 A1  Jul. 26, 2012

(51) Int. Cl.
*G05D 11/02* (2006.01)

(52) U.S. Cl.
USPC .......................................... 137/602; 204/409

(58) Field of Classification Search
CPC ......... F16K 11/00; F16K 11/10; F16K 11/18; F16K 11/22; B01F 13/02; B01F 13/0233; B01F 13/0238; B01F 13/0277
USPC ........ 204/409, 412; 137/551–559, 605–607, 137/861–876, 624.2, 884; 366/152.1, 182.4
See application file for complete search history.

(56) References Cited

U.S. PATENT DOCUMENTS

| | | | |
|---|---|---|---|
| 4,174,733 A | 11/1979 | Eidsmore et al. | |
| 4,956,067 A | 9/1990 | Yun et al. | |
| 5,398,721 A | 3/1995 | Pryor | |
| 6,884,333 B2 | 4/2005 | Landau | |
| 7,361,257 B2 | 4/2008 | Wang et al. | |
| 2009/0059717 A1* | 3/2009 | Itoh et al. | 366/152.2 |

FOREIGN PATENT DOCUMENTS

GB 840918 7/1960

OTHER PUBLICATIONS

"Multiple Tube Rotameters"; FL-2AA Series Complete Assemblies found on omega.com/fl3600, p. B-32.
"Gas Proportioning Rotameters Back Pressure Compensated", FL-1GP found on info@omega.com, p. B-33.
Gamry Instruments "RDE710 Rotating Electrode" found on http://www.gamry.com/HomePage/Index.html, p. 1 and 2.

* cited by examiner

*Primary Examiner* — J. Christopher Ball
(74) *Attorney, Agent, or Firm* — Young, Basile, Hanlon & MacFarlane, P.C.

(57) ABSTRACT

Disclosed herein are fluid distribution methods and assemblies for supplying fluid to test assemblies. One embodiment of a fluid distribution assembly comprises at least two input lines each configured to supply a fluid. A source selection component is connected to the input lines and configured to receive the fluid of the input lines and select from the fluids a target fluid. A range selection component is configured to receive the target fluid and to select a flow range of the target fluid, outputting the target fluid to a flow component comprising a first flow adjustment component having a first flow rate resolution and a second flow adjustment component having a second flow rate resolution. The range selection component is configured to selectively output the target fluid to one of the first flow adjustment component and the second flow adjustment component based on the selected flow range.

20 Claims, 6 Drawing Sheets

FLUID DISTRIBUTION ASSEMBLY FOR TESTING SYSTEMS

TECHNICAL FIELD

The present invention relates in general to a fluid distribution assembly for testing assemblies, and in particular a fluid distribution assembly for catalytic testing.

BACKGROUND

Experimental procedures in laboratories often require highly concentrated fluids with little or no contamination. Such fluids are typically routed to testing equipment at particular fluid flow rates and pressures. As a non-limiting example, experimental procedures involving various fuel cell components typically have stringent requirements for fluids that are utilized in the procedures. Fuel cells efficiently and electrochemically convert fuel into electric current, which may then be used to power electric circuits such as drive systems for vehicles. Fuel cell anode catalysts function by oxidizing molecules of a fuel source such as hydrogen into component protons and electrons. The protons are passed through an electrolyte, and the electrons are diverted to an electric load of the fuel cell. Catalysts comprising platinum are typically used in such applications. Since platinum is very expensive, scientists and designers are continuously seeking ways to reduce the precious metal content in catalysts. One approach to testing fuel cell catalyst materials outside of fuel cells includes conducting experiments with three-electrode electrochemical cells in a laboratory. Such electrochemical cells typically need to be supplied with one or more gases at particular pressures or having particular flow rates. Fluctuations in these values during an experiment can negatively impact the reliability of results. Also, it can be tedious and time-consuming to reconfigure a test setup in order to use different gases, which also risks contamination of the fluid supply lines or the testing equipment itself.

SUMMARY

Disclosed herein are embodiments of fluid distribution assemblies for supplying fluid to test assemblies. One embodiment of a fluid distribution assembly for supplying fluid to testing systems comprises at least two input lines, each input line configured to supply a fluid. A source selection component is connected to the at least two input lines and configured to receive the fluid of the at least two input lines and select from the fluids a target fluid. A range selection component is configured to receive the target fluid from the source selection component and to select a flow range of the target fluid, outputting the target fluid to a flow component comprising a first flow adjustment component having a first flow rate resolution and a second flow adjustment component having a second flow rate resolution that is different than the first flow rate resolution. The range selection component is configured to selectively output the target fluid to one of the first flow adjustment component and the second flow adjustment component based on the flow range target by the range selection component.

Also disclosed herein are methods of distributing fluid to testing systems. One method disclosed herein comprises providing at least two fluids to a testing system from at least two fluid sources through a closed system. Providing the at least two fluids comprises supplying at least two fluids to a source selection component, selecting from the at least two fluids a target fluid using a user control and supplying the target fluid to a range selection component where a flow range of the target fluid is chosen. Based on the target flow range, the target fluid is supplied to one of a first flow adjustment component having a first flow rate resolution and a second flow adjustment component having a second flow rate resolution that is different than the first flow rate resolution. A flow rate of the target fluid is adjusted with one of the first flow adjustment component and the second flow adjustment component. Then, the target fluid is discharged through a delivery conduit directly to the testing system.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
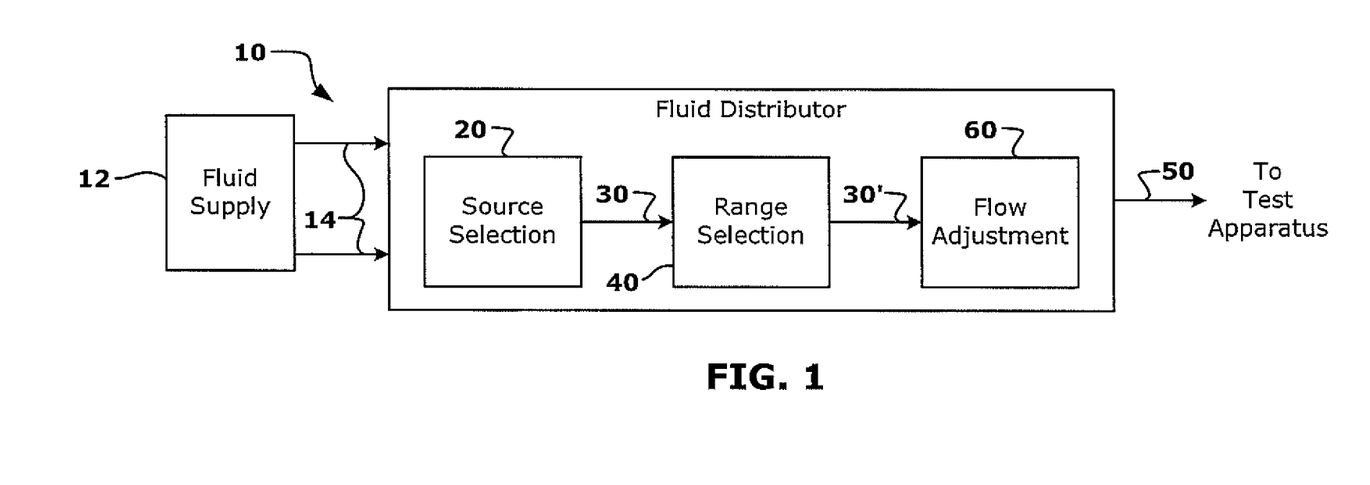
FIG. 1 is a functional block diagram of a fluid distribution assembly as disclosed herein.

FIG. 1 is a block diagram of an embodiment of a fluid distribution assembly 10 for supplying fluid to testing systems. A fluid supply 12 supplies two or more different fluids through individual input lines 14 to a source selection component 20, described in more detail below. A target fluid is selected from the two or more fluids by the source selection component 20 and sent through conduit 30 to a range selection component 40, also described in more detail below. A flow range of the target fluid is chosen in the range selection component 40. From the range selection component 40, the target fluid is diverted through conduit 30' to a flow component 60 based on the selected flow range. The flow component 60, described in more detail below fine-tunes the flow rate of the target fluid and discharges the target fluid to a testing apparatus through delivery conduit 50.

Figure 7:
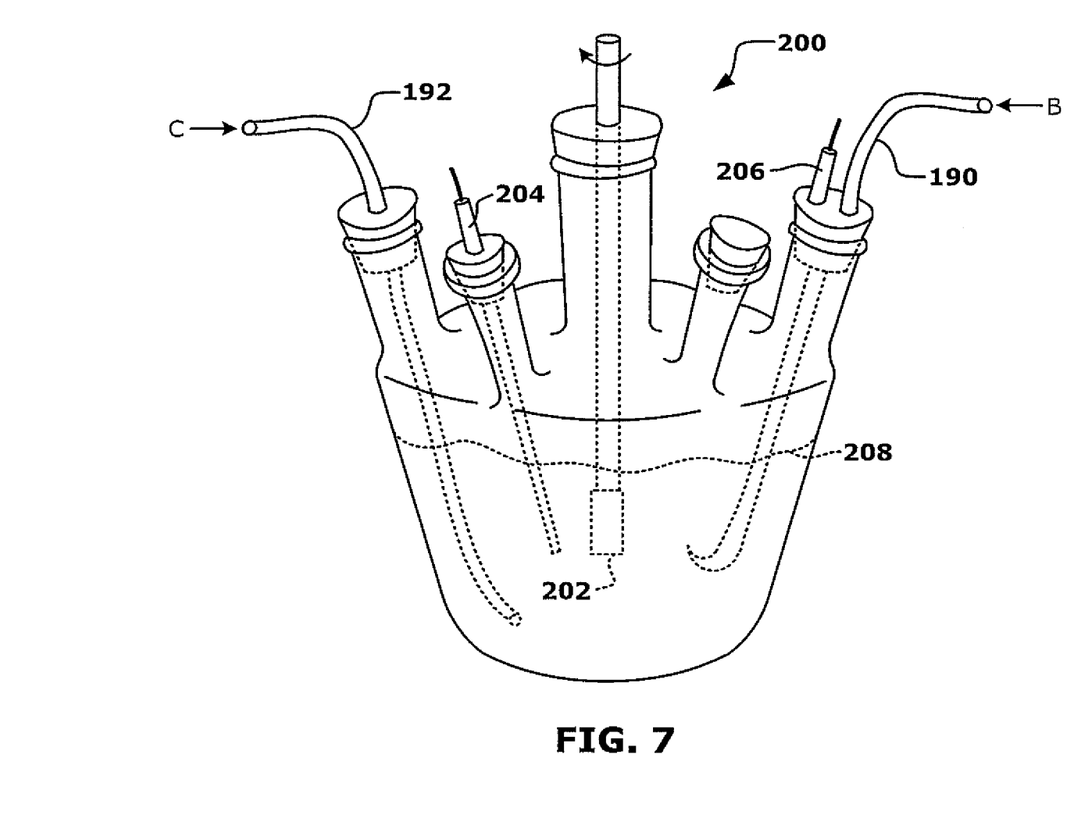
FIG. 7 is a perspective view of an exemplary test apparatus that receives fluid flows from the fluid distribution assemblies described herein.

The testing apparatus can be, for example, an electrochemical cell as shown in FIG. 7 and described herein. The electrochemical cell is not meant to be limiting and is one of various testing arrangements that can be used with the fluid distribution assembly 10 and is described herein for illustration. It is contemplated that the fluid distribution assembly 10 can be used with any testing apparatus that requires at least two fluids at specific flow rates where reduced or no contamination of the fluid is advantageous.

Figure 2:
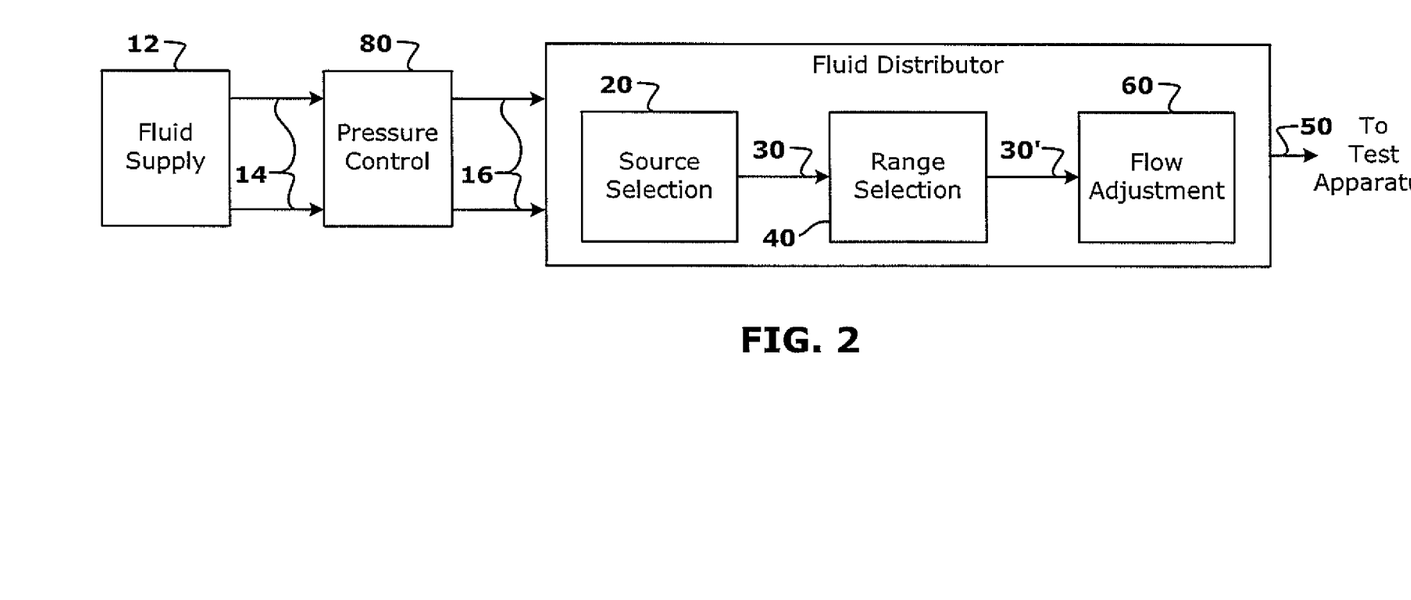
FIG. 2 is a functional block diagram of another fluid distribution assembly as disclosed herein.

FIG. 2 is a block diagram of another embodiment of a fluid distribution assembly 10 further comprising a pressure control module 80 for manipulating the pressure of each of the two or more different fluids. The reference numbers are the same as those used in the first embodiment for ease of description. As illustrated, the fluid supply 12 supplies two or more different fluids through individual input lines 14 to the pressure control module 80 before the fluid is fed to the source selection component 20. From the pressure control module 80, where the line pressure of each fluid is adjusted, the pressure modified fluid is fed to the source selection component 20 through conduit 16. A target fluid is selected from the two or more fluids by the source selection component 20 and sent through conduit 30 to a range selection component 40. A flow range of the target fluid is chosen in the range selection component 40. From the range selection component 40, the target fluid is diverted through conduit 30' to a flow component 60 based on the selected flow range. The flow component 60 adjusts the flow of the target fluid and discharges the target fluid to a testing apparatus through delivery conduit 50.

As noted above, depending on the embodiment, the fluid supply 12 either supplies fluid to the pressure control module 80 or the source selection component 20. The fluid supply 12 can be, as non-limiting examples, canisters or cylinders of gas or any volume of liquid. As used herein, fluid supply 12 encompasses the supply and supply devices of any number of fluids as desired or required.

Figure 3:
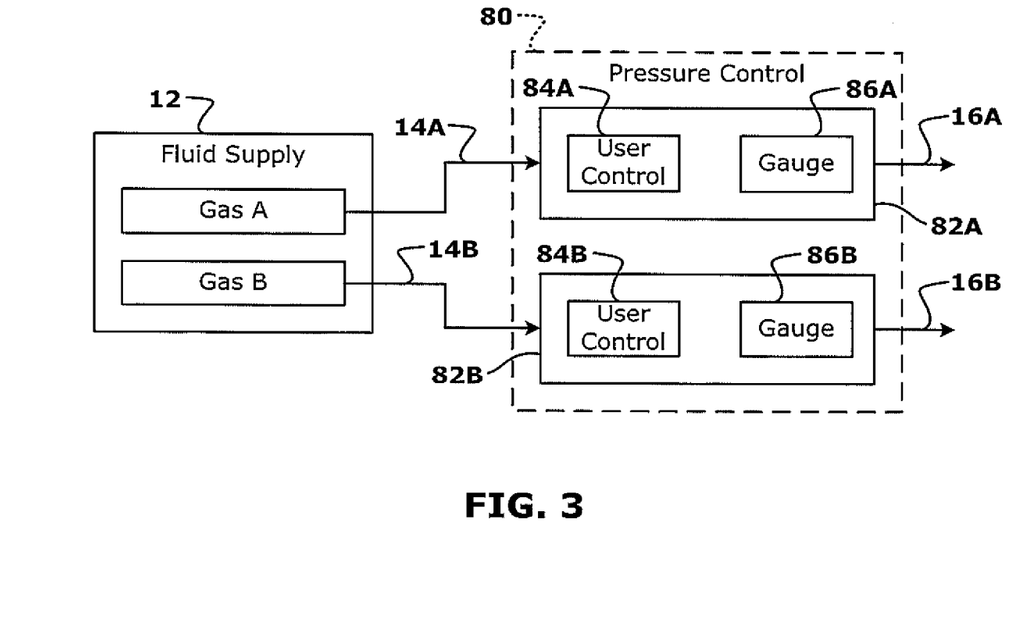
FIG. 3 is a functional detailed view of a pressure control module as disclosed herein.

The pressure control module 80 will be discussed with reference to FIG. 3. FIG. 3 illustrates a fluid supply 12 with two supply fluids A and B. Each fluid A and B is supplied to the pressure control module 80 through its own input line 14A and 14B. The input lines can be of any material that is suitable for use with the individual fluid it supplies. Non-limiting examples include fluoropolymers, nylons, polyethylenes, polycarbonate, polypropylene, polyimide, nylons, and metals (stainless steels, copper, and nickel). The input lines 14A and 14B deliver their respective fluids to regulation components 82A and 82B. Each of the regulation components 82A and 82B regulates the line pressure of a respective fluid. This allows for the regulation of the fluids at different pressures or equal pressures as desired or required. Typically, the fluids are supplied to the regulation components 82A and 82B at a higher than desired pressure, with the regulation components 82A and 82B reducing the pressure to a desired value.

The regulation components 82A and 82B can each comprise a user control 84A and 84B and a visible pressure indicator 86A and 86B. The user controls 84A and 84B allow a user to select the desired or required line pressure of a respective fluid. As non-limiting examples, the user controls 84A and 84B can be knobs, actuators (mechanical or electrical) labeled with indicia such as up and down arrows, or an electronic input device to directly input the desired pressure. As non-limiting examples, the visible indicator 86A and 86B can be indicia on a knob, a digital display, or a gauge that displays the line pressure of the respective fluid. The fluids are discharged from their respective regulation components 82A and 82B at the selected pressure through their respective conduits 16A and 16B to the source selection component 20. Like the input lines 14A and 14B, the conduits 16A and 16B and other conduit used herein can be of any material that is suitable for use with the individual fluid it supplies at the selected pressure. Non-limiting examples include fluoropolymers, nylons, polyethylenes, polycarbonate, polypropylene, polyimide, nylons, and metals (stainless steels, copper, and nickel).

Figure 4:
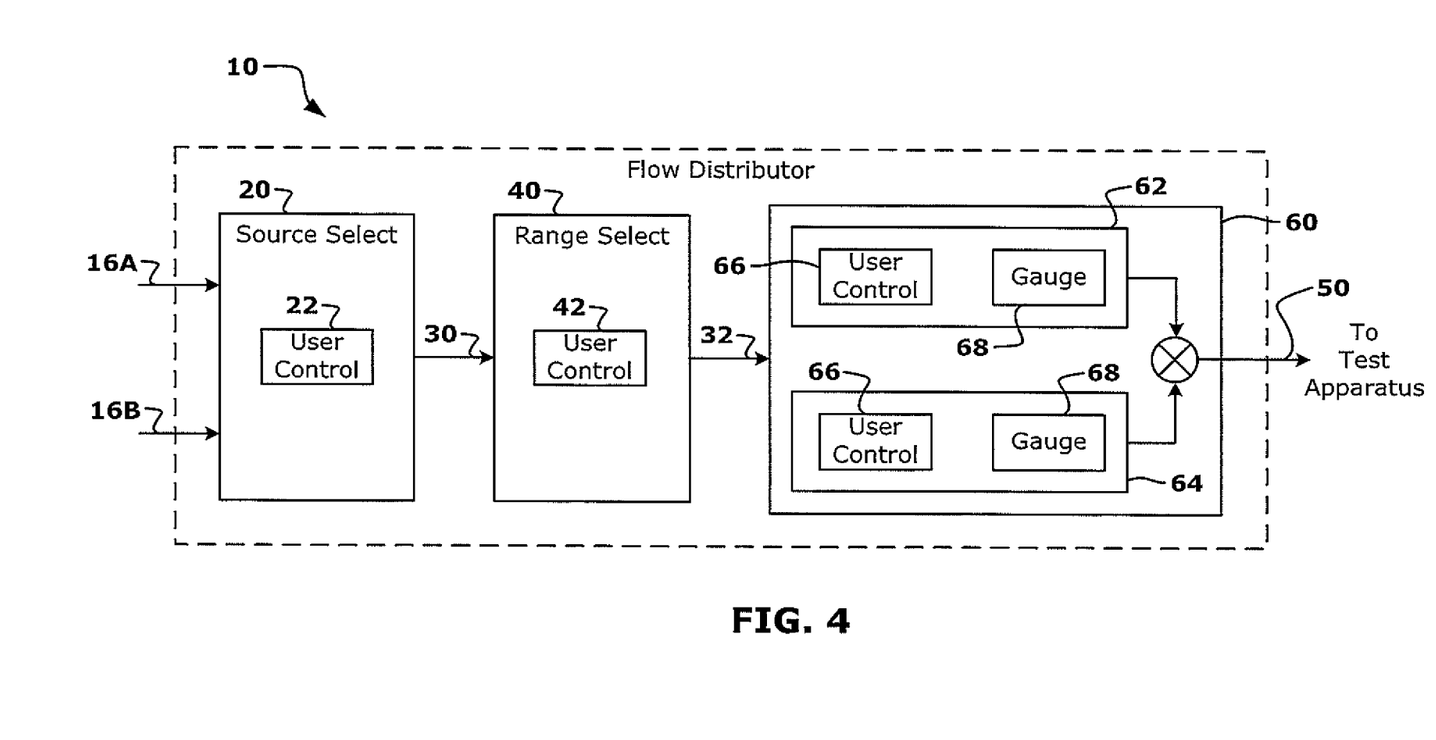
FIG. 4 is a functional detailed view of a source selection component as disclosed herein.

The source selection component 20, range selection component 40 and flow component 60 will be described with reference to FIG. 4. As noted above, depending on the embodiment, fluid will be supplied to the source selection component 20 either directly from the fluid supply 12 or from the pressure control module 80. Therefore, the source selection component 20 will receive fluids through either input lines 14A and 14B or conduits 16A and 16B. In FIG. 4, these lines are labeled 16A and 16B for illustration purposes.

Fluids A and B are fed to the source selection component 20 which comprises a user selection control 22 for selecting one of fluids A and B. As non-limiting examples, the user selection control 22 can be a knob, actuators (mechanical or electrical) labeled with indicia such as push buttons with up and down arrows, or an electronic input device to directly input the desired fluid. The user selection control 22 can include indicia that indicate the fluid options, with the knob or a digital display pointing to the target fluid. The knob, for example, can turn a valve which blocks the flow of the non-selected fluid and allows continued flow of the target fluid. Only one user selection control 22 is illustrated in FIG. 4. However, more than one user selection control 22 is contemplated depending on the number of fluids supplied and the number of fluids to be selected. For example, two user selection controls 22 can be used for four supplied fluids wherein one control selects one of the first two fluids and the other control selects one of the other two fluids.

The target fluid flows from the source selection component 20 to the range selection component 40 through conduit 30. Only one conduit is shown in FIG. 4 representing the target fluid. The embodiment described in FIGS. 3 and 4 has a fluid supply 12 with two fluids. Two fluids are used as an example and as noted above, any number of fluids can be used. It is contemplated that two or more fluids can be selected from a larger number of supply fluids, each target fluid having its own conduit to prevent contamination. It is also contemplated that each fluid supplied to the flow distribution assembly 10 will have a dedicated conduit between each element, whether the fluid is selected or not. Accordingly, the conduit would not contain fluid if its fluid is a non-selected fluid and would contain fluid if the fluid is a target fluid.

The range selection component 40 comprises a user flow control 42 for selecting one of a plurality of flow ranges. As non-limiting examples, the user flow control 42 can be a knob, actuators (mechanical or electrical) labeled with indicia such as push buttons with up and down arrows, or an electronic input device to directly input the desired flow. The user flow control 42 can include indicia that indicate the flow range options, with the knob or a digital display pointing to the selected flow range. The knob, for example, can turn a valve which directs the fluid to a particular part of the flow component 60. Only one user flow control 42 knob is illustrated in FIG. 4. However, the range selection component 40 can include multiple user flow controls 42 such that a different user flow control 42 is associated with each of the fluids required for a particular testing procedure.

Once the flow range has been chosen for the target fluid, the target fluid is directed from the range selection component 40 to the flow component 60 through conduit 32. The flow component 60 comprises two or more flow adjustment components. As illustrated in FIG. 4, the flow component 60 comprises a first flow adjustment component 62 and a second flow adjustment component 64. Each flow adjustment component allows for fine tuning of the flow rate within the selected range. The number of flow adjustment components can be dependent on the number of potential fluid flow ranges that are desired or on the total number of target fluids. Each flow adjustment component can fine tune each fluid flow rate within each of the ranges from which a selection can be made.

The first flow adjustment component 62 has a first flow rate resolution and the second flow adjustment component 64 has a second flow rate resolution different from the first flow rate resolution. As non-limiting examples, the first and second flow rate resolutions can be a high flow rate resolution of between 0.5 to 2.5 liters/min. and a low flow rate resolution of between 0 to 0.5 liters/min. Different flow rate resolutions can be desired or required depending on the use of the fluid. For example, it may be desirable to select a higher flow rate for fluids that are used to purge a test assembly and a lower flow rate for fluids that are used in the assembly during an experimental procedure. It is also possible for the flow rate ranges of different flow adjustment components to overlap if such an arrangement is needed or desired.

Each of the first and second flow adjustment components 62, 64 comprises a user adjustment control 66 for fine tuning the flow rate and a visible indicator 68 for displaying the flow rate of the target fluid. As non-limiting examples, the user adjustment control 66 can be a knob, actuators (mechanical or electrical) labeled with indicia such as push buttons with up and down arrows, or an electronic input device to directly input the desired flow from within the flow rate range. The user adjustment control 66 can include indicia that indicate the flow rate range, with the knob or a digital display pointing to the selected flow rate. The knob, for example, can adjust a valve which changes the amount of flow based on the selected flow rate. As non limiting examples, the visible indicator 68 can be a digital display of the flow rate in any form, or the visible indicator 68 can simply be a mechanical gauge.

From the flow component 60, the target fluid at the desired flow rate will be discharged through delivery conduit 50 to a test apparatus. An example of a test apparatus will be described below with reference to FIG. 7. The fluid distribution assembly 10 allows for quick and precise changes to be made to the test apparatus as desired or required. Supply fluids for the test apparatus can be selected from a variety of sources, at various pressures, and at specific flow rates simply with the fluid distribution assembly.

A method of distributing fluid to a testing apparatus is also disclosed with reference to the assembly described above. The method provides at least two fluids to a testing system from at least two fluid sources through a closed system with the following steps. At least two fluids are supplied to the source selection component 20. From the at least two fluids a target fluid is chosen using user control 22. The target fluid is supplied to the range selection component 40 where a flow range of the target fluid is chosen. Based on the selected flow range, the target fluid is supplied to one of the first flow adjustment component 62 having a first flow rate resolution and the second flow adjustment component 64 having a second flow rate resolution that is different than the first flow rate resolution. The flow rate of the target fluid is adjusted with one of the first flow adjustment component 62 and the second flow adjustment component 64. The target fluid is then discharged through the delivery conduit 50 directly to the testing system.

Prior to supplying the at least two fluids to the source selection component 20, the at least two fluids can be supplied to the pressure control module 80 where the line pressures of the at least two fluids may be controlled by the regulation component 82A, 82B in the pressure control module 80.

Another embodiment of a fluid distribution assembly 100 is illustrated and discussed with reference to FIGS. 5 and 6. A method of distributing fluid to testing systems is also described by following the flow of fluid through the system. The components of the fluid distribution assembly are the same as described above. However, in FIGS. 5 and 6, the use of five supply fluids is described.

Figure 5:
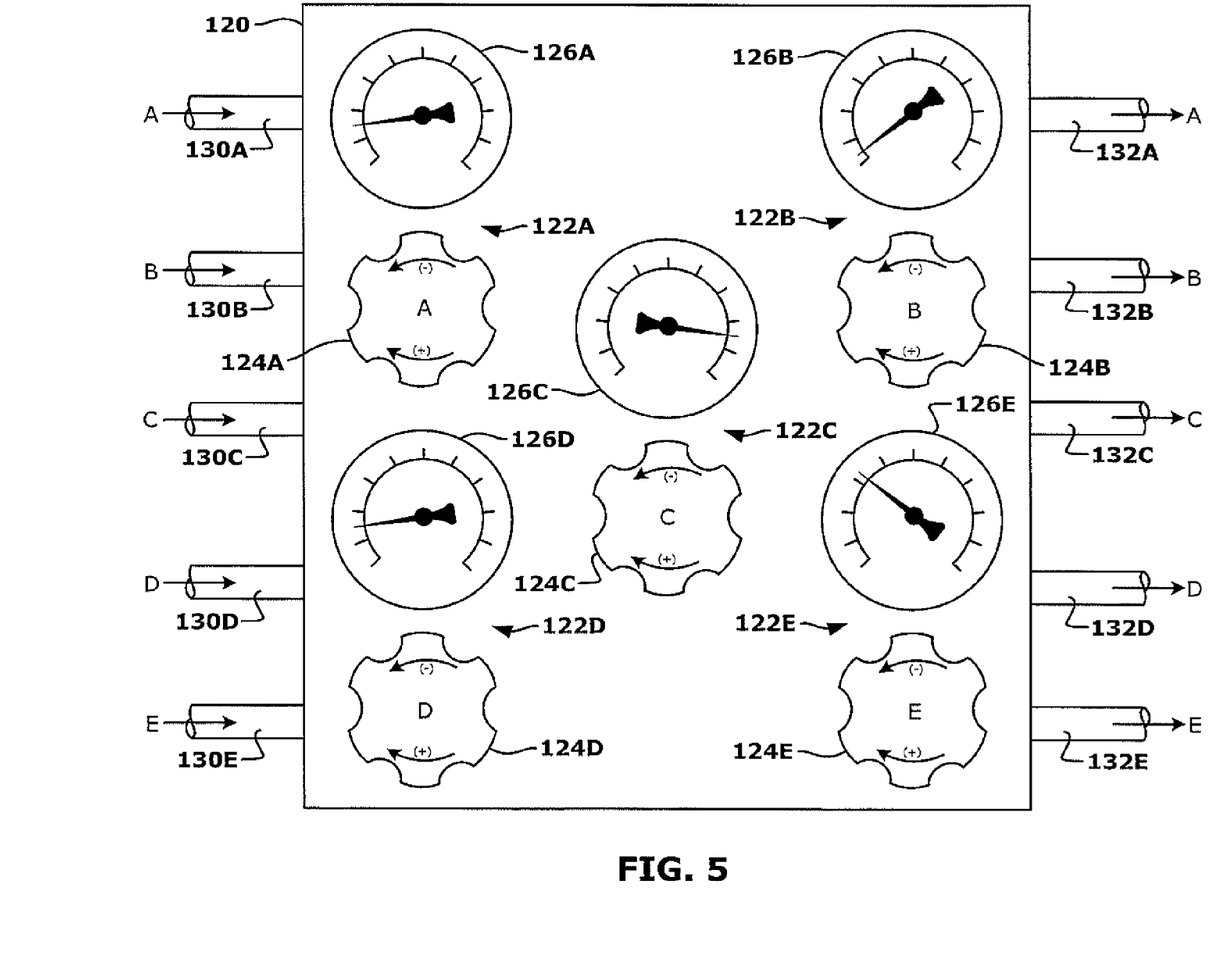
FIG. 5 is a front profile view of an exemplary pressure control module that includes adjustment knobs and gauges for several fluid flows.

FIG. 5 is a front profile view of a pressure control module 120 supplied by a fluid supply (not shown) with five fluids A-E. As non-limiting examples, the fluids can be hydrogen, oxygen, helium, air and nitrogen. Each of the five fluids has its own input line 130A-E to the pressure control module 120. The pressure control module 120 comprises five regulation components 122A-E, each in turn having a user control 124A-E and a visible pressure indicator 126A-E. The line pressure of each of the five fluids A-E flowing through the pressure control module 120 is adjusted with the user control 124A-E based on the associated visible pressure indicator 126A-E. The pressure adjusted fluids A-E flow from the pressure control module 120 through individual conduits 132A-E.

Figure 6:
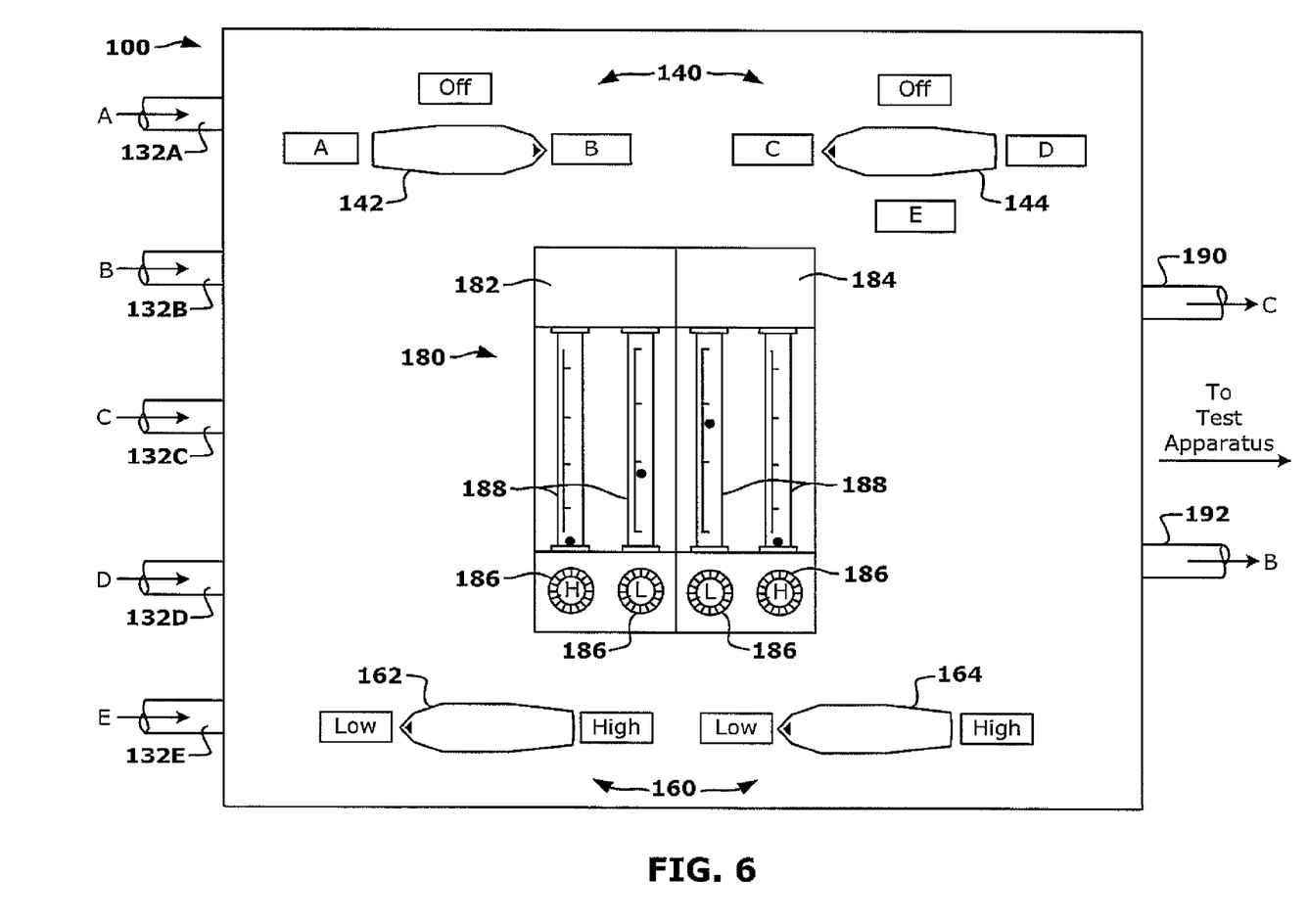
FIG. 6 is a front profile view of an exemplary fluid distribution assembly that includes selection knobs and flow meters.

FIG. 6 is a front profile view of a fluid distribution assembly 100 that receives fluid from the pressure control module 120 as described above. As illustrated, the assembly 100 will be fed from the pressure control module 120 with each pressure adjusted fluid A-E flowing into the source selection component 140 through conduits 132A-E. In this embodiment, two of the five fluids A-E will be selected. The source selection component 140 has two user selection controls 142, 144. User selection control 142 allows for selection between fluids A and B. User selection control 144 allows for selection between fluids C, D and E. Each of the user selection controls 142 and 144 also has an "off" selection. The number of controls and the division of fluids is provided by means of example and is not meant to be limiting.

As illustrated, fluid B is a target fluid from user selection control 142 and fluid C is the target fluid from user selection control 144. Target fluids B and C are directed to the range selection component 160 from the source selection component 140. The range selection component 160 comprises respective user flow controls 162, 164 for each of target fluids B and C. If the number of target fluids is more than two, there would be at least that number of user flow controls. The flow rate range of the target fluid B is selected with user flow control 162, while the flow rate range of the target fluid C is selected with user flow control 164. Each of user flow controls 162, 164 have a high and low range from which to select. This is a non-limiting example, and additional ranges from which to select can be included.

Once a flow range has been selected for each target fluid B and C, the target fluid is directed from the range selection component 160 to the flow component 180. The flow component 180 comprises two or more flow adjustment components, depending on the number of target fluids. As illustrated in FIG. 6, the flow component 180 comprises a first flow adjustment component 182 and a second flow adjustment component 184. Each of the first and second flow adjustment components 182, 184 comprises user adjustment controls 186 for fine tuning the flow rate and visible indicators 188 for displaying the flow rate of the target fluid within each of the ranges from which the flow rate can be selected. In this example, target fluid B has the low range chosen with the user flow control 162, so in the first flow adjustment component 182, the user adjustment control 186 and the visible indicator 188 associated with the low flow range would be used to fine tune the flow rate of target fluid B. Target fluid C also has the low range chosen with the user flow control 164, so in the second flow adjustment component 184, the user adjustment control 186 and the visible indicator 188 associated with the low flow range would be used to fine tune the flow rate of target fluid C.

From adjustment of the flow rates of target fluids B and C with the first and second flow adjustment components 182, 184, the target fluids B and C are directed through delivery conduits 190 and 192, respectively, to the testing apparatus. As shown in FIG. 6, there are two delivery conduits 190, 192 because there are two feeds to the testing apparatus. This number is exemplary and can be different depending on the type of testing apparatus. Having a dedicated conduit for each feed to the testing apparatus reduces contamination and loss of pressure and flow. However, dedicated feeds may be associated with each selectable range of a flow adjustment component such that each feed associated with a particular flow adjustment component is routed to the same destination at the testing apparatus. In this case, the outputs of different flow ranges associated with the same flow adjustment component would not need to be merged prior to delivery to the testing apparatus.

FIG. 7 is an example of a testing apparatus to which the target fluids B and C can be supplied for use in a laboratory procedure. The testing apparatus 200 in FIG. 7 is a three-electrode electrochemical cell. As shown, target fluids B and C are supplied to the testing apparatus 200 through delivery conduits 190 and 192, respectively. The three-electrode electrochemical cell comprises a working electrode 202, shown here as a rotating-disk electrode, a counter electrode 204, and a reference electrode 206. The three-electrode electrochemical cell is filled to a predetermined level with a liquid electrolyte 208. Delivery conduit 192 is mounted such that the target fluid C bubbles into the liquid electrolyte 208. Delivery conduit 190 is mounted such that the target fluid B is delivered to the reference electrode 206, which can also comprise a platinum wire. The rotating-disk electrode 202 is rotated to provide stirring to the electrolyte solution 208 as the target fluids B and C are delivered. To test the working electrode 202, the liquid electrolyte 208 can be an acidic solution such as perchloric acid or sulfuric acid. Target fluid B can be one of helium and hydrogen and target fluid C can be one of oxygen and nitrogen. In very general terms, when fluid C is introduced to the liquid electrolyte 208 and fluid B is delivered to the reference electrode 206, an electric current is established between the working electrolyte and the counter electrode 204. The electric potential (or difference in voltage) between the working electrode 202 and the counter electrode 204 due to the flow of current can then be measured. The reference electrode 206 generates a known voltage from which the actual value of the electric potential generated by working electrode 202 can be determined.

When a particular testing procedure is completed, the fluid distribution system can deliver nitrogen, for example, through delivery conduit 192 (the same conduit through which nitrogen or oxygen can be delivered during the testing procedure) at a comparatively higher pressure and flow rate in order to purge the test system and prepare for a new test without contaminating the liquid electrolyte or the electrodes.

The three-electrode electrochemical cell is provided as an example of a testing apparatus 200 for use with the disclosed fluid distribution assemblies, as highly concentrated fluid with little or no contamination at a predetermined pressure and flow rate is required in order to obtain useful test results. Of course, other testing arrangements can be used with the fluid distribution systems disclosed herein.

While the invention has been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A fluid distribution assembly for supplying fluid to testing systems comprising:
    at least two input lines, each input line configured to supply a fluid;
    a source selection component connected to the at least two input lines and configured to receive the fluid of the at least two input lines and select from the fluids a target fluid;
    a range selection component configured to receive the selected fluid from the source selection component and to select a flow range of the target fluid; and
    a first flow component, wherein the first flow component comprises:
        a first flow adjustment component having a first flow rate resolution; and
        a second flow adjustment component having a second flow rate resolution that is different than the first flow rate resolution, wherein the range selection component is configured to selectively output the target fluid to one of the first flow adjustment component and the second flow adjustment component based on the flow range selected by the range selection component.

2. The fluid distribution assembly of claim 1 further comprising:
    a pressure control module that includes a regulation component, with the regulation component regulating a line pressure of the fluid in each of the at least two input lines prior to the source selection component receiving the fluids.

3. The fluid distribution assembly of claim 2, wherein the regulation component includes user controls for selectively adjusting the line pressure of each of the fluids in the at least two input lines.

4. The fluid distribution assembly of claim 2, wherein the regulation component includes a visible indicator that displays the line pressure of each of the fluids.

5. The fluid distribution assembly of claim 1, wherein the source selection component includes user controls for selecting the target fluid.

6. The fluid distribution assembly of claim 1, wherein the range selection component includes user controls for selecting one of the first flow adjustment component and the second flow adjustment component to which the target fluid is outputted.

7. The fluid distribution assembly of claim 1, wherein each of the first flow adjustment component and the second flow adjustment component includes a respective user control for adjusting a flow rate of the target fluid.

8. The fluid distribution assembly of claim 1, wherein each of the first flow adjustment component and the second flow adjustment component includes a respective visible indicator for displaying a flow rate of the target fluid.

9. The fluid distribution assembly of claim 1, wherein fluid output from both the first flow adjustment component and the second flow adjustment component is fed through one delivery conduit.

10. The fluid distribution assembly of claim 9, wherein the delivery conduit communicates the target fluid from one of the first and second flow adjustment components to a three-electrode electrochemical cell.

11. The fluid distribution assembly of claim 10, wherein the three-electrode electrochemical cell comprises a rotating-disk electrode.

12. The fluid distribution assembly of claim 9, wherein the three-electrode electrochemical cell comprises a liquid electrolyte.

13. The fluid distribution assembly of claim 12, wherein the delivery conduit is mounted such that it bubbles the target fluid into the liquid electrolyte.

14. The fluid distribution assembly of claim 1, wherein one of the fluids in the at least two input lines is one of helium gas and hydrogen gas.

15. The fluid distribution assembly of claim 1, wherein one of the fluids in the at least two input lines is one of nitrogen gas, oxygen gas, and air.

16. The fluid distribution assembly of claim 1, further comprising:
a second flow component, wherein the second flow component comprises:
a third flow adjustment component having a third flow rate resolution; and
a fourth flow adjustment component having a fourth flow rate resolution that is different than the third flow rate resolution, wherein the at least two input lines are five input lines each configured to supply a fluid, and wherein the source selection component is connected to the five input lines and is configured to receive the fluid of the five input lines and select from the fluids two target fluids.

17. The fluid distribution assembly of claim 16, wherein the range selection component is configured to receive the two target fluids from the source selection component and selectively output a first one of the two target fluids to one of the first and second flow adjustment components and a remaining one of the two target fluids to one of the third and fourth flow adjustment components.

18. A method of distributing fluid to testing systems comprising:
supplying at least two fluids to a source selection component;
selecting from the at least two fluids a target fluid using a user control;
supplying the target fluid to a range selection component;
selecting a flow range of the target fluid;
based on the selected flow range, supplying the target fluid to one of a first flow adjustment component having a first flow rate resolution and a second flow adjustment component having a second flow rate resolution that is different than the first flow rate resolution;
adjusting a flow rate of the target fluid with one of the first flow adjustment component and the second flow adjustment component; and
after the adjusting step, discharging the target fluid through a delivery conduit directly to the testing system, wherein the testing system is a three-electrode electrochemical cell.

19. The method of claim 18 further comprising:
prior to supplying the at least two fluids to the source selection component, supplying the at least two fluids to a pressure control module; and
controlling a line pressure of the at least two fluids with a regulation component in the pressure control module.

20. A fluid distribution assembly for supplying fluid to testing systems comprising:
at least two input lines, each input line configured to supply a fluid;
a source selector connected to each of the at least two input lines and configured to select a fluid based on a first user input, wherein the source selector provides fluid communication between one of the at least two input lines supplying the selected fluid and a source output conduit, and closes remaining of the at least two input lines;
a flow range selector configured to receive the selected fluid from the source selector through the source output conduit and to select a flow range of the selected fluid based on a second user input;
a first flow adjustor having a first flow rate resolution; and
a second flow adjustor having a second flow rate resolution that is different than the first flow rate resolution, wherein the range selector is further configured to selectively output the selected fluid to one of the first flow adjustor through a first flow adjustment supply line and the second flow adjustor through a second flow adjustment supply line based on the second user input, and wherein each of the first flow adjustor and the second flow adjustor has a corresponding user control configured to fine tune the flow range of the selected fluid before entering a testing system.

\* \* \* \* \*